(12) United States Patent
Reusmann

(10) Patent No.: US 6,734,271 B2
(45) Date of Patent: May 11, 2004

(54) POLYORGANOSILOXANE RESINS WITH RELEASE EFFECT

(75) Inventor: Gerhard Reusmann, Münster (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 10/271,616

(22) Filed: Oct. 16, 2002

(65) Prior Publication Data

US 2003/0068506 A1 Apr. 10, 2003

Related U.S. Application Data

(63) Continuation of application No. 09/619,728, filed on Jul. 19, 2000, now abandoned.

(30) Foreign Application Priority Data

Jul. 21, 1999 (DE) .......................................... 199 34 103

(51) Int. Cl.$^7$ ............................................ C08G 77/445
(52) U.S. Cl. .............................. 528/29; 528/17; 528/18; 525/446; 525/477
(58) Field of Search .............................. 525/446, 477; 428/447; 528/29, 17, 18

(56) References Cited

U.S. PATENT DOCUMENTS

| | | | |
|---|---|---|---|
| 2,462,242 A | 2/1949 | Webb et al. | |
| 2,606,510 A | 8/1952 | Collins | |
| 2,672,104 A | 3/1954 | Clark | |
| 3,002,946 A | 10/1961 | Thomas | |
| 3,925,276 A | 12/1975 | Merrill | |
| 4,302,512 A | 11/1981 | Weitemeyer et al. | |
| 4,898,772 A | 2/1990 | Priesch et al. | |

FOREIGN PATENT DOCUMENTS

| | | | | |
|---|---|---|---|---|
| DE | 34 12 648 C2 | 6/1987 | | |
| DE | 37 28 414 C1 | 9/1988 | | |
| EP | 0 092 701 A2 | 11/1983 | | |
| EP | 0 239 049 B1 | 4/1993 | | |
| EP | 0 638 605 A1 | 2/1995 | | |
| EP | 638605 A1 | * 2/1995 | ........... | C08G/77/42 |
| GB | 2 152 946 A | 8/1985 | | |
| JP | 05125191 A | * 5/1993 | ........... | C08G/77/18 |

* cited by examiner

Primary Examiner—Margaret G. Moore
Assistant Examiner—Marc S. Zimmer
(74) Attorney, Agent, or Firm—Frommer Lawrence & Haug

(57) ABSTRACT

The present invention relates to compositions for preparing coatings having a release effect, to substrates coated therewith, and to a process for preparing the compositions.

9 Claims, No Drawings

POLYORGANOSILOXANE RESINS WITH RELEASE EFFECT

RELATED APPLICATIONS

This application is a continuation of U.S. application Ser. No. 09/619,728, filed on Jul. 19, 2000, now abandoned, which in turn claims priority of German application 199 34 103.6, filed Jul. 21, 1999, herein incorporated by reference.

BACKGROUND OF THE INVENTION

1. Field of the Invention

The present invention relates to compositions for making coatings having a release effect, to substrates coated therewith, and to a process for preparing the compositions.

2. Description of the Related Art

Coatings based on silicone resin and silicone oil, and their use as release coatings, have long been known. For instance, U.S. Pat. No. 2,606,510 describes the use of silicone resins, U.S. Pat. No. 2,462,242 the use of silicone oils.

The use of hydroxy-functional polymethylphenylsilicone resins for release coatings on baking trays is described in U.S. Pat. No. 2,672,104.

The combination of silicone resins and silicone oils for release coatings has been used in practice for a number of years. Combinations of this kind are particularly suitable owing to the release effect for a wide range of foodstuffs and owing to the good resistance properties. An example is the combination described in U.S. Pat. No. 3,002,946 of 80–98% by weight binder, 1–10% by weight hydroxy-terminal polymethylphenylsiloxane oil, and 1–19% by weight methyl-endcapped polydiorganosiloxane oil.

Other patents deal with the improvement of the formulation, as described in U.S. Pat. No. 3,002,946. These improvements are in some cases, as described in U.S. Pat. No. 3,925,276, improvements to the silicone resin, or, as in U.S. Pat. No. 4,302,512, the improvement of the silicone oil. European Patent EP 0 239 049 describes the optimization of the catalysts in the preparation of the release coating.

The use of silicone polyesters is described in combination with laminar solids in UK Patent GB 2 152 946 A and in combination with linear siloxanes in German Patent DE 37 284 14 A.

OBJECT OF THE INVENTION

An object of the present invention is to provide a polysiloxane resin having a release effect and to provide the release coating prepared therefrom, having improved properties in respect of the release effect. The release coating must be nontoxic and easy to apply to coated or uncoated substrates.

SUMMARY OF THE INVENTION

This object is achieved by means of a composition for preparing coatings having a release effect, comprising:

(A) 100 parts by weight of one or more polysiloxane resins of the general formula $$R_aSi(OR')_bO_{(4-a-b)/2}$$

where $0<a<2$, $0<b<2$ and $a+b<4$, (B) from about 0.05 to about 10 parts by weight of one or more linear and/or branched polysiloxanes of the formula $$R"O—[R'"_2Si—O]_n—R"$$

and (C) from about 5 to about 80 parts by weight of a hydroxyl-containing polyester, where R, R', R" and R'" each independently of one another are an alkyl radical, preferably having 1 to 8 carbon atoms, or an aromatic radical, preferably having 6 to 20 carbon atoms, and n is a number in the range from 4 to 5000.

At elevated temperature, in the absence or presence of one or more solvents and judiciously using catalysts, it is possible to obtain a composition which after drying results in an improved release coating.

DESCRIPTION OF THE PREFERRED EMBODIMENTS

Component (A) $(R_aSi(OR')_bO_{(4-a-b)/2})$ is a polysiloxane resin where $0<a<2$, $0<b<2$ and $a+b<4$ R an alkyl group, preferably containing 1 to 8 carbon atoms, or an aromatic group, preferably 6 to 20 carbon atoms. Examples of alkyl groups are methyl, ethyl, isopropyl, n-butyl and t-butyl. An example of an aromatic group is phenyl. Especially preferred substituents for R are methyl or phenyl or mixtures of methyl and phenyl. A preferred substituent for R' is an alkyl group containing 1 to 8 carbon atoms, with methyl or ethyl, being especially preferred.

The preparation of silicone resins of component (A) has been known for a long time in the literature (see W. Noll in "Chemie und Technologie der Silicone", Verlag Chemie, Weinheim (1968)) and is described, for example, in German Patent DE 34 12 648 C.

The polysiloxane (component (B)) of the formula R"O—[R'"$_2$Si—O]$_n$—R" is also commonly referred to as a release oil. R" is, for example, a hydrogen radical or an alkyl group having 1 to 8 carbon atoms. R" can also be an —Si(CH$_3$)$_3$ group.

R'" within the molecule of component (B) may be identical or different and may be a phenyl group or an alkyl group, preferably containing 1 to 8 carbon atoms. Especially preferred is where R'" is methyl or phenyl or mixtures of methyl and phenyl. A small proportion of R'" may also be a polysiloxane side chain —[R"$_2$Si—O]$_n$—R", so that slightly branched structures of the release oil are possible as well as linear structures. The value for n is on average from 4 to 5000.

Likewise suitable as component (B) are pure polydimethylsiloxanes and also polydimethylsiloxanes in which up to 20 mol % of the methyl radicals have been replaced by phenyl radicals. Siloxanes of this kind have no reactive groups (R"=—Si(CH$_3$)$_3$).

The hydroxyl-containing polyester, which is described, for example, in DE 37 28 414 C1, the entire content of which is incorporated by reference, is prepared, for example, by esterification reaction from polycarboxylic acids and polyalcohols or by transesterification reaction from polycarboxylic esters with polyalcohols, with a molar ratio COOR:C—OH, or COOH:C—OH, respectively, of >1.0.

The proportions of components (A), (B) and (C) can be varied within wide ranges.

Particular preference is given, for the purposes of the present invention, to compositions containing from about 0.5 to about 5 parts by weight of polysiloxane (B), based on 100 parts by weight of component (A).

Particular preference is also given to compositions containing from about 10 to about 30 parts by weight of polyester (C), based on 100 parts by weight of component (A).

The coating compositions are preferably obtainable by reacting components (A), (B) and (C) with one another at the same time. These components are preferably only reacted up to a degree of conversion of from about 20 to about 80%, in particular from about 25 to about 80%. A sufficient degree of conversion can be determined, for example, by withdrawing a portion of the reaction mixture, drying it on a glass plate, and determining the transparency of the coating on the glass plate. A transparent film indicates a sufficient reaction conversion. The reaction conversion can be determined precisely, moreover, from the amount of ethanol distilled off.

Particularly preferred substrates that can be coated by means of the present invention are, for example, metal baking sheets, baking tins, pans, metal pots, and the like.

By baking the composition at temperatures and under conditions as described, for example, in DE 37 28 414 C1 it is possible to obtain complete reaction conversion.

The modification of the silicone resin with a polyester by transesterification reaction increases the resistance to boiling water and reduces the thermoplasticity of the cured coating. There are likewise improvements in the pigmentability and gloss of the coating.

Judiciously, the reaction is conducted at a temperature higher than room temperature using a catalyst. Suitable catalysts, as described in EP 0 092 701 A, are, for example, metal catalysts based, for example, on magnesium, cobalt, iron, aluminum, titanium, lead, zinc or tin, in the form, for example, of their laurates, octoates, acetates, acetylacetonates, neodecanoates or naphthalates. Examples of particularly suitable organotin catalysts are dibutyltin dilaurate, dibutyltin dioctoate and dibutyltin diacetate. Examples of particularly suitable organotitanium catalysts are tetra(n-butyl)titanate and tetra(isopropyl)titanate.

It has surprisingly been found that by chemical attachment of polysiloxane resin (A) and polysiloxane (B) by reaction with a hydroxy-functional polyester (C) it is possible to achieve a marked improvement in the resistance of the coating in comparison to commercially customary blends of silicone resin or silicone polyester resin with a polysiloxane (release oil) (B). Silicone polyester resins of this kind are normally prepared by reacting silicone resin (A) and polyester (C). There was likewise a decisive increase in the compatibility of silicone resin (A) and polysiloxane (B) as a result of the chemical attachment. The separation tendency of the polysiloxane (B) is markedly reduced by this means.

The compositions can be applied to the substrate in question by knife coating, dipping or spraying and lead after the baking process to a coating having an outstanding release effect.

If desired, colored coating compositions can be obtained by formulating with pigments. Additives selected from the group consisting of solvents, fillers, pigments, adhesion promoters, rheology control agents, stabilizers and additives allow the formulation to be adapted to the particular mode of application. Through the incorporation of PTFE (polytetrafluoroethylene) powder it is possible, for example, to improve the release effect further.

The invention is illustrated by the following examples.

Working Examples

Reference Example 1

Preparation of the Silicone Resin (A)

The alkoxypolysiloxane of the formula $(C_6H_5)_{0.45}(CH_3)_{0.65}$—$Si(OC_2H_5)_{0.28}O_{1.31}$(A) is described in DE 37 28 414 C and was prepared in accordance with DE 34 12 648 A from phenyltrichlorosilane, methylethoxypolysiloxane, ethanol and water. The silicone resin had an ethoxy content of 11.9% by weight.

EXAMPLE 1

Composition of the Invention 263 g of a hydroxyl-containing polyester (C) having an OH number of 560 mg KOH/g (prepared from trimethylolpropane and dimethyl terephthalate with catalysis in accordance with Example 1.1 from DE 37 28 414 A) was reacted with 1000 g of the silicone resin (A) from Reference Example 1 and 2.5 g of a polydimethylsiloxane (B) of the formula $C_2H_5O$—$[Si(CH_3)_2O]_{30}$—$C_2H_5$ in 781 g of xylene, 381 g of diethylene glycol dimethyl ether and 0.3 g of tetra(n-butyl)titanate at 135° C. to a reaction conversion at which the composition, when dried on a glass plate, gave a clear, transparent coating. The amount of ethanol removed by distillation, 74 g, corresponded to a reaction conversion of 60%.

EXAMPLE 2

Composition of the Invention 263 g of a hydroxyl-containing polyester (C) having an OH number of 560 mg KOH/g (prepared from trimethylolpropane and dimethyl terephthalate with catalysis in accordance with Example 1.1 from DE 37 28 414 A) was reacted with 1000 g of the silicone resin (A) from Reference Example 1 and 2.5 g of a polydimethylsiloxane (B) of the formula

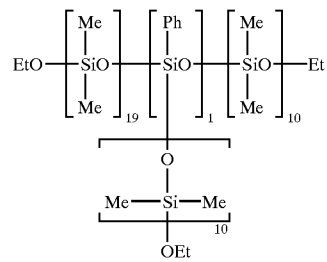

in 781 g of xylene, 381 g of diethylene glycol dimethyl ether and 0.3 g of tetra(n-butyl)titanate at 135° C. to a reaction conversion at which the composition, when dried on a glass plate, gave a clear, transparent coating. The amount of ethanol removed by distillation, 74 g, corresponded to a reaction conversion of 60%.

Comparative Example 1

Noninventive Composition 263 g of a hydroxyl-containing polyester (C) having an OH number of 560 mg KOH/g (prepared from trimethylolpropane and dimethyl terephthalate with catalysis in accordance with DE 37 28 414 A) was reacted with 1000 g of the silicone resin (A) from Reference Example 1 in 781 g of xylene, 381 g of diethylene glycol dimethyl ether and 0.3 g of tetra(n-butyl)titanate at 135° C. to a reaction conversion at which the composition, when dried on a glass plate, gave a clear, transparent coating. The amount of ethanol removed by distillation, 73 g, corresponded to a reaction conversion of 60%. Subsequently added to the silicone polyester resin were 2.2 g of a polydimethylsiloxane (B) of the formula $C_2H_5O—[Si(CH_3)_2O]_{30}—C_2H_5$, and 5 g of tetra(n-butyl) titanate were added. The formulation corresponded to formulation Z--1 from DE 37 28 414 C.

Comparative Example 2

A mixture of methylphenylsilicone resin and polydiorganosiloxane in accordance with Example 1 of EP0 239 049 C.

EXAMPLE 2

Preparation of the Coatings

The compositions were prepared by mixing the components as in Table 1.

TABLE 1

Formulation of the compositions (in amounts by weight)

|  | Coating 1 | Coating 2 | Coating 3 | Coating 4 |
|---|---|---|---|---|
| Composition as per Example 1 | 500 g |  |  |  |
| Composition as per Example 2 |  | 500 g |  |  |
| Composition as per Compar. Ex. 1 |  |  | 500 g |  |
| Composition as per Compar. Ex. 2 |  |  |  | 500 g |
| Xylene |  |  |  | 100 g |

The coatings were applied by knife coating with a dry film thickness of from about 20 to 25 μm and were baked at 280° C. for 15 minutes. Each of the films obtained was homogeneous.

Test Methods
Release Effect

The release effect was determined by baking a commercially customary baking mixture for cakes on the aluminum sheet coated with the compositions. The ease of removal of the cake after baking was evaluated:

0: no cake adhesion

1: slight cake adhesion

2: cake difficult to remove

3: cake largely remains adhering to the coating.

The stability of the release effect was tested by repeating the operation 100 times.

Boiling Water Test

An aluminum sheet coated with the composition (20 μm) was immersed for 8 hours in a container filled with boiling water. Following removal from the boiling water, the coating was examined for adhesion and blistering. The adhesion test was carried out by cross-cutting in accordance with DIN ISO 2409. The evaluation was made in accordance with the following ratings:

0: no effect after exposure

1: slight blistering and/or slight loss of adhesion

2: severe blistering and/or severe loss of adhesion.

Temperature Stability

The temperature stability was determined by storage at 220° C. for a period of 16 hours. The parameters examined were the yellowing resistance (Δb in the L a b system), adhesion, and gloss retention. The adhesion test was carried out by cross-cutting in accordance with DIN ISO 2409. The evaluation was made in accordance with the following ratings:

0: no effect as a result of temperature exposure

1: slight yellowing and/or slight loss of adhesion after temperature exposure

2: severe yellowing and/or severe loss of adhesion after temperature exposure.

Storage Stability

In determining the storage stability after 4 weeks at 40° C., the parameters assessed were stability of viscosity, clouding, separation phenomena and processability.

Adhesion

The adhesion test was carried out by cross-cutting in accordance with DIN ISO 2409.

Pencil Hardness

The pencil hardness was determined in accordance with ECCA Standard T4-ISO 3270-ASTM D 3363.

The advantages of the coatings of the invention become clear from the tests conducted (Table 2).

TABLE 2

Properties of the coatings tested:

|  | Coating 1 | Coating 2 | Coating 3 | Coating 4 |
|---|---|---|---|---|
| Storage stability liquid coating (4 weeks at 40° C.) | sat. | sat. | unsat. (separation) | unsat. (separation) |
| Release effect | 0 | 0 | 0 | 0 |
| Release effect after 100 cycles | 0–1 | 0 | 2 | 1 |
| Boiling water resistance | 0 | 0 | 0 | 3 |
| Pencil hardness at room temperature: at 200° C.: | 5H 4H | 5H 4H | 5H 4H | H 2B |
| Gloss at 60° (before/after 100 cycles) | 90/88 | 92/91 | 92/82 | 85/72 |
| Temperature stability at 220° C., 30 hours | 0 | 0 | 0 | 0 |
| Substrate adhesion | sat. | sat. | sat. | sat. |

(where (un-)sat. = (un-)satisfactory)

The above description is intended to be illustrative and not limiting. Various changes and modifications in the embodiments described herein may occur to those skilled in the art. Those changes can be made without departing from the scope and spirit of the invention.

What is claimed is:

1. A process for preparing a coating composition comprising reacting components (A) 100 parts by weight of one or more polysiloxane resins of the general formula

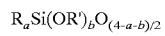

$R_aSi(OR')_bO_{(4-a-b)/2}$ where $0<a<2$, $0<b<2$, and $a+b<4$, (B) from 0.05 to 10 parts by weight of one or more linear and/or branched polysiloxanes of the formula

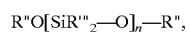

$R"O[SiR'''_2—O]_n—R"$, and (C) from 5 to 80 parts of a hydroxyl-containing polyester where R and R' are independently of one another an alkyl or aromatic radical;

R" is independently hydrogen, an alkyl radical, an aromatic radical, or an $Si(CH_3)_3$ group;

R''' is independently a hydrogen atom, alkyl, or —$[R"_2Si—O]_n$—R"; and n is a number in the range of 4 to 5,000;

in the presence of a metal catalyst and at least one solvent and optionally further adding one or more additives selected from the group consisting of pigments, rheology control agents, fillers, solvents, adhesive promoters, and stabilizers.

2. The process according to claim 1 wherein components (A), (B) and (C) are reacted simultaneously.

3. The process according to claim 1 wherein the catalyst is an organotitanium catalyst.

4. The process according to claim 1 wherein the radicals R, R', R" and R'" each independently of one another are a radical selected from methyl, ethyl, isopropyl, n-butyl, t-butyl and phenyl.

5. The process according to claim 1 wherein R" is a hydrogen radical or a —Si(CH$_3$)$_3$ group.

6. The process according to claim 1 wherein the radical R'" is a polysiloxane side chain of the general formula $$-[R''_2Si-O]_n-R''.$$

7. The process as claimed in claim 1, wherein the degree of conversion of the reaction products of (A) and (C) and (B) and (C) is from about 20 to about 80%.

8. The process as claimed in claim 1, wherein the degree of conversion of the reaction product of (A) and (C) and (B) and (C) is from about 25 to about 40%.

9. The process according to claim 1 which is a clear, transparent film.

* * * * *